US009975449B2

United States Patent
Takeshima et al.

(10) Patent No.: US 9,975,449 B2
(45) Date of Patent: May 22, 2018

(54) POWER CONVERSION DEVICE (71) Applicant: Mitsubishi Electric Corporation, Chiyoda-ku (JP)

(72) Inventors: Yoshihiro Takeshima, Chiyoda-ku (JP); Masaki Yamada, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days. days.

(21) Appl. No.: 15/518,125

(22) PCT Filed: Jan. 14, 2016

(86) PCT No.: PCT/JP2016/050926
§ 371 (c)(1),
(2) Date: Apr. 10, 2017

(87) PCT Pub. No.: WO2016/117438
PCT Pub. Date: Jul. 28, 2016

(65) Prior Publication Data
US 2017/0305298 A1    Oct. 26, 2017

(30) Foreign Application Priority Data
Jan. 21, 2015    (JP) .................................. 2015-009148

(51) Int. Cl.
*H02P 1/00*    (2006.01)
*B60L 15/00*    (2006.01)
(Continued)

(52) U.S. Cl.
CPC .............. *B60L 15/007* (2013.01); *B60L 7/14* (2013.01); *B60L 7/16* (2013.01); *B60L 11/1803* (2013.01);
(Continued)

(58) Field of Classification Search
USPC ........... 318/139, 722, 769, 800, 247, 400.12
See application file for complete search history.

(56) References Cited

U.S. PATENT DOCUMENTS

2008/0306643 A1    12/2008   Hanyu et al.
2009/0315392 A1*   12/2009   Ichikawa ................ B60L 11/18
                                                  307/9.1
(Continued)

FOREIGN PATENT DOCUMENTS

JP    2007-186081 A    7/2007
JP    2008-131830 A    6/2008
(Continued)

OTHER PUBLICATIONS

International Search Report dated Apr. 12, 2016 in PCT/JP2016/050926 filed Jan. 14, 2016.

*Primary Examiner* — Bentsu Ro
*Assistant Examiner* — Iftekhar Mustafa
(74) *Attorney, Agent, or Firm* — Oblon, McClelland, Maier & Neustadt, L.L.P.

(57) ABSTRACT

A power convertor including an inverter driving a motor generator, a first DC/DC converter connected to a DC bus of the inverter, a second DC/DC converter varying voltage of the DC bus, and a control device controlling the inverter, the first DC/DC converter, and the second DC/DC converter. The power converter is a power conversion device setting voltage of the DC bus in a second control state higher than a voltage of the DC bus in a first control state by controlling the second DC/DC converter according to the control device. By setting the voltage of the DC bus of the inverter to a low voltage when it is not necessary, it is possible to reduce loss in the inverter and the step-down DC/DC converter, and to downsize the inverter and the step-down DC/DC converter.

14 Claims, 9 Drawing Sheets (51) Int. Cl.
  *B60L 11/18* (2006.01)
  *B60L 7/14* (2006.01)
  *B60L 7/16* (2006.01)
  *H02M 7/5387* (2007.01)
  *H02P 27/08* (2006.01)
  *H02M 3/158* (2006.01)
(52) U.S. Cl.
  CPC ..... *H02M 3/1588* (2013.01); *H02M 7/53871* (2013.01); *H02P 27/08* (2013.01); *B60L 2210/10* (2013.01); *B60L 2210/40* (2013.01); *B60L 2240/427* (2013.01); *B60Y 2200/92* (2013.01)

(56) References Cited

U.S. PATENT DOCUMENTS

| | | | |
|---|---|---|---|
| 2010/0133913 A1* | 6/2010 | Iida | B60L 11/1868 307/82 |
| 2010/0217466 A1* | 8/2010 | Ichikawa | B60K 6/48 701/22 |
| 2010/0332062 A1 | 12/2010 | Goto et al. | |
| 2012/0245777 A1 | 9/2012 | Goto et al. | |
| 2012/0245778 A1 | 9/2012 | Goto et al. | |
| 2012/0245779 A1 | 9/2012 | Goto et al. | |
| 2013/0002186 A1 | 1/2013 | Iwahori | |
| 2013/0030633 A1 | 1/2013 | Yamamoto et al. | |

FOREIGN PATENT DOCUMENTS

| | | | |
|---|---|---|---|
| JP | 2009-18719 A | | 1/2009 |
| JP | 2010-93981 A | | 4/2010 |
| JP | 2010-259220 A | | 11/2010 |
| JP | 2010259220 A | * | 11/2010 |
| JP | 2012-95418 A | | 5/2012 |
| JP | 2013-31238 A | | 2/2013 |
| JP | 2013-169140 A | | 8/2013 |
| JP | 2013169140 A | * | 8/2013 |
| JP | 2013-240177 A | | 11/2013 |
| JP | 2014144193 A | * | 8/2014 |
| WO | 2011/102082 A1 | | 8/2011 |
| WO | 2011/125187 A1 | | 10/2011 |

* cited by examiner

FIG. 9

POWER CONVERSION DEVICE

TECHNICAL FIELD

The present invention relates to a power conversion device including an inverter for driving a motor generator, a DC/DC converter connected to a DC bus of the inverter, and a control device for controlling the inverter and the DC/DC converter.

BACKGROUND ART

In recent years, improvement of fuel economy is strongly required in automobiles against the background of environmental and resource problems. As a technology to realize this, hybrid vehicles with an electric power train system added to the powertrain system based on the conventional internal combustion engine are rapidly spreading.

An internal combustion engine, a motor generator, a high voltage battery, an inverter, a low voltage battery (14 V lead battery), a step-down DC/DC converter, and 14V electrical equipment and an ECU are assembled as a basic power train system of a hybrid vehicle.

Also, in order to improve fuel economy as much as possible, it is necessary to collect a lot of decelerating regenerative energy, the decelerating regenerative energy becomes high power in a short time, and cannot be accepted with a low voltage battery (14 V lead battery).

Also, the generated voltage of the motor generator is increased, a nickel metal hydride battery or a lithium ion battery, which is an electricity storage device good at rapid energy charging and discharging, is used as a high voltage battery, a power train system that adds a high voltage battery to a DC bus of an inverter are disclosed in Patent Literature 1.

[Patent Literature 1] JP2009-18719 A

DISCLOSURE OF INVENTION

Technical Problem

In Patent Literature 1, during the deceleration regeneration, the DC bus voltage of the inverter becomes an high value, although it is possible to positively increase the energy regeneration amount, since the DC bus voltage remains at a high voltage, in the heavy load state in which the power demanded by the 14V electrical components is high, the generation loss associated with the power conversion of the step-down DC/DC converter increases, there is a problem leading to an increase in the size of the step-down DC/DC converter.

Further, when the engine is restarted from the idling stop state by using the motor generator (hereinafter referred to as M/G start), if the DC bus voltage remains at a high voltage, since the current flowing through the motor generator is limited, the generation loss associated with the power conversion in the inverter increases, there is also a problem leading to an increase in size and cost as the cooling performance of the inverter is improved.

In addition, although the electricity storage device owns a CMU (cell monitor unit) in order to control variations in charge state between electricity storage devices, the time required for correcting the variation in the state of charge (cell balance function) is at least several hours level, there was also a problem that the cell balance function could not be realized in real time.

An object of the present invention is to reduce losses in inverters and step-down DC/DC converters and to downsize inverters and step-down DC/DC converters.

Solution to Problem

A power conversion device provides an inverter for driving the motor generator,
a first electric storage device for supplying power to electric components,
a first DC/DC converter for connecting DC bus of the inverter and the first electric storage device,
a plurality of electrically insulated second electric storage devices,
a second DC/DC converter using the plurality of electrically insulated second power storage devices as an input power source, and
a control device controlling a motor generator, the first DC/DC converter, and the second DC/DC converter;
wherein
the second DC/DC converter includes a first half bridge and a second half bridge,
the first half bridge includes a first switching element and a second switching element connected in series to each other and is connected between terminals of one of the plurality of second electric storage devices,
the second half bridge includes a third switching element and a fourth switching element connected in series to each other and is connected between terminals of the other second electric storage devices,
a connection point of the third switching element and the fourth switching element of the second half bridge is connected to the first half bridge
a connection point between the first switching element and the second switching element of the first half bridge is connected to the DC bus via the smoothing element shared by the first half bridge and the second half bridge, and wherein
the control device selectively switches among the plurality of electrically insulated second electric storage devices by controlling switching of the switching elements of each of the first half bridge and the second half bridge by controlling the output of the second DC/DC converter, the voltage of the DC bus in the first control state is lower than the voltage of the DC bus in the second control state.

Advantageous Effects of Invention

A power conversion device provides an inverter for driving the motor generator,
a first electric storage device for supplying power to electric components,
a first DC/DC converter for connecting DC bus of the inverter and the first electric storage device,
a plurality of electrically insulated second electric storage devices,
a second DC/DC converter using the plurality of electrically insulated second power storage devices as an input power source, and
a control device controlling a motor generator, the first DC/DC converter, and the second DC/DC converter;
wherein
the second DC/DC converter includes a first half bridge and a second half bridge,
the first half bridge includes a first switching element and a second switching element connected in series to each other and is connected between terminals of one of the plurality of second electric storage devices, the second half bridge includes a third switching element and a fourth switching element connected in series to each other and is connected between terminals of the other second electric storage devices, a connection point of the third switching element and the fourth switching element of the second half bridge is connected to the first half bridge a connection point between the first switching element and the second switching element of the first half bridge is connected to the DC bus via the smoothing element shared by the first half bridge and the second half bridge, and wherein the control device selectively switches among the plurality of electrically insulated second electric storage devices by controlling switching of the switching elements of each of the first half bridge and the second half bridge by controlling the output of the second DC/DC converter, the voltage of the DC bus in the first control state is lower than the voltage of the DC bus in the second control state, by keeping the voltage of the DC bus low at a time other than necessary, loss in the inverter and in the first DC/DC converter can be reduced, it is possible to downsize the inverter and the first DC/DC converter, moreover, it is possible to plan the downsizing of the second DC/DC converter aimed even when a plurality of second power storage devices are provided.

DESCRIPTION OF EMBODIMENTS

First Embodiment

An example of a power conversion device according to a first embodiment of the present invention will be described below with reference to FIGS. 1 to 5.

Figure 1:
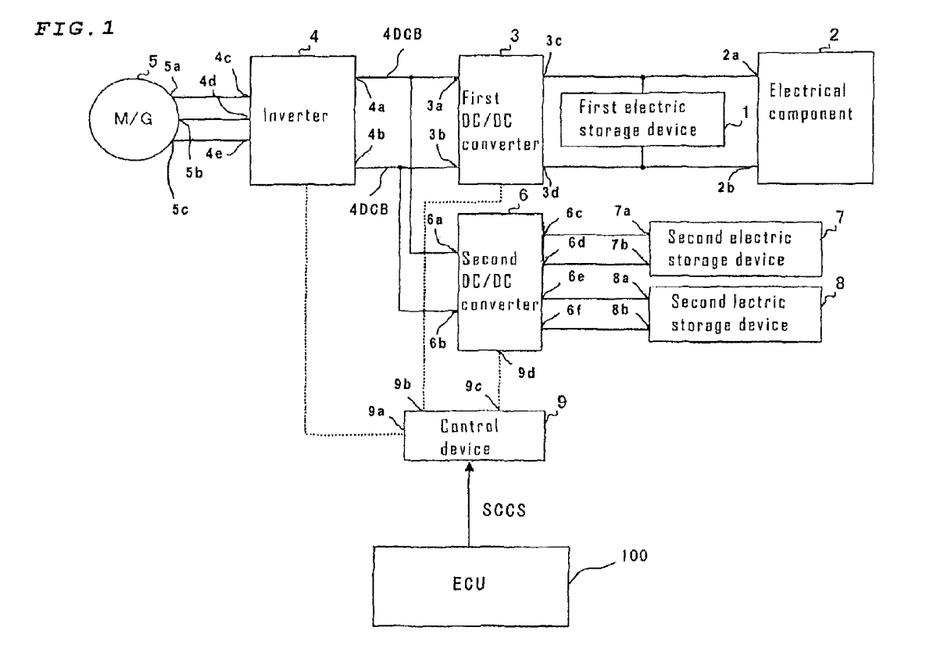
FIG. 1 is a block configuration diagram showing a power conversion device according to a first embodiment of the present invention.
Figure 2:
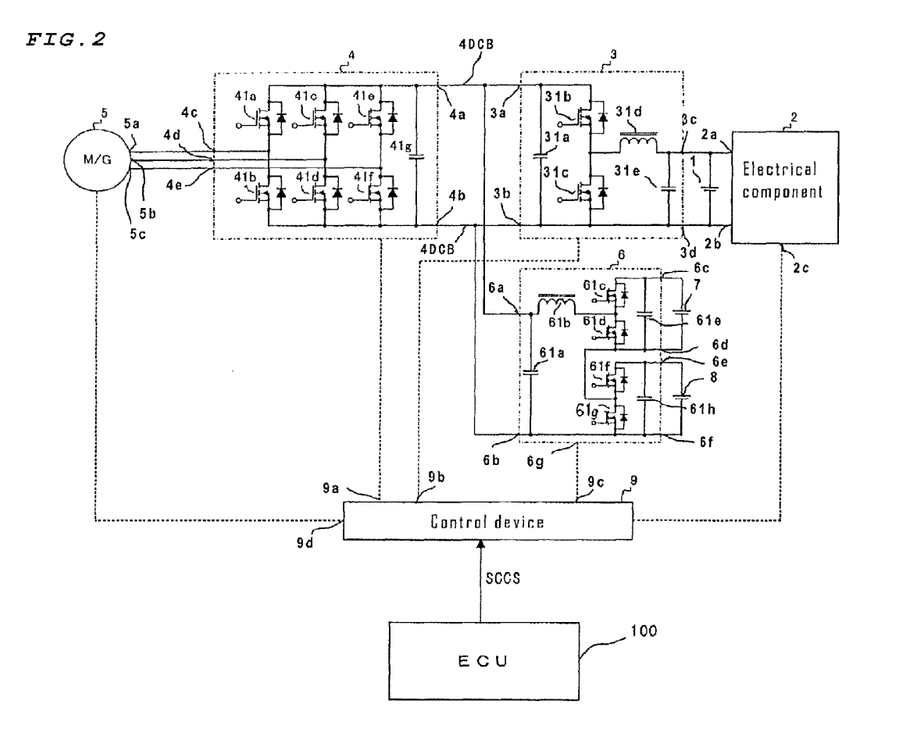
FIG. 2 is a circuit diagram showing a power conversion device according to a first embodiment of the present invention.
Figure 3:
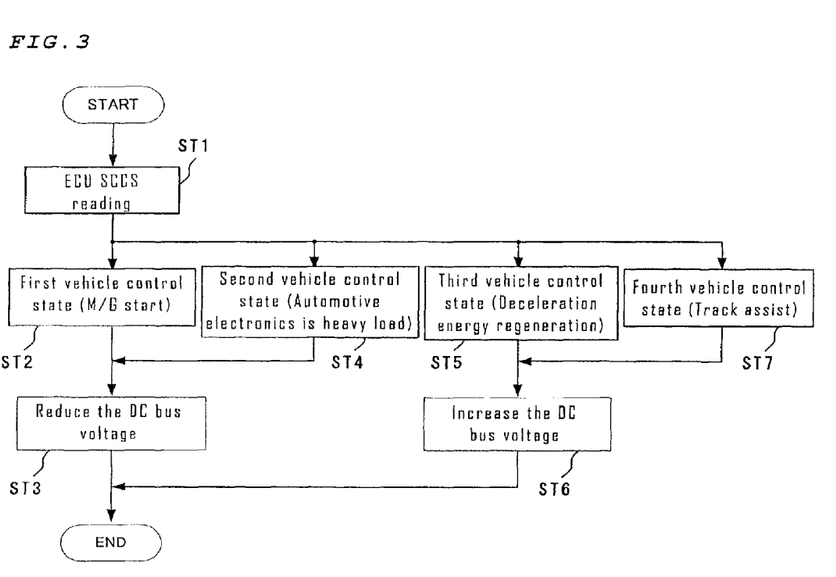
FIG. 3 is a control flow diagram showing a power converter according to a first embodiment of the present invention.

FIG. 1 shows a block diagram of a power conversion device according to a first embodiment of the present invention, FIG. 2 shows a circuit diagram of a power conversion device to which a representative circuit of each block is added, and FIG. 3 shows a control flow chart in each vehicle control state.

First, the block diagram of FIG. 1 will be described.

As an electric storage device, two kinds of electric storage devices having different voltages and electric characteristics such as the first electric storage device 1 (for example, lead battery) and a plurality of second electric storage devices 7, 8 (for example, nickel hydrogen battery, lithium ion battery, etc.) is used.

An each of output voltage of the second electric storage devices 7, 8 (for example, a nickel hydride battery, a lithium ion battery, etc.) is higher than an output voltage of the first electric storage device 1 (for example, lead battery), further, the second electric storage devices 7, 8 (for example, a nickel hydrogen battery, a lithium ion battery, etc.) and the first electric storage device 1 (for example, a lead battery) have different electric characteristics as well known.

As shown in FIG. 1, the first electric storage device 1 is connected in parallel to connection lines of terminals 2a and 2b of a vehicle onboard electrical component 2 and terminals 3c and 3c of a first DC/DC converter 3.

Terminals 3a and 3b of the first DC/DC converter 3, and terminals 4a and 4b of an inverter 4 and terminals 6a and 6b of a second DC/DC converter 6 are connected respectively, as shown illustratively in FIG. 1. Further, the connection line for connecting a DC side terminal 4a of the inverter 4 and an inverter side terminal 3a of the first DC/DC converter 3, and the connection line connecting a DC side terminal 4b of the inverter 4 and the inverter side terminal 3b of the first DC/DC converter 3, are generally said to be a DC bus of the inverter 4.

An AC side terminals 4c, 4d and 4e of the inverter 4 are respectively connected to terminals 5a, 5b and 5c of a motor generator (M/G) 5 as shown illustratively in FIG. 1.

Output terminals 7a and 7b of the second electric storage device 7 are respectively connected to input side terminals 6c and 6d of a second DC/DC converter 6, as shown illustratively in FIG. 1.

As shown illustratively in FIG. 1, output terminals 8a, 8b of the second electric storage device 8 are respectively connected to input side terminals 6e, 6f of the second DC/DC converter 6. That is the second DC/DC converter 6, is provided by the terminals 6c and 6d on the input side to which electric power is supplied from one of the second electric storage devices 7 of the two second electric storage devices 7 and 8, and the input side terminals 6e and 6f to which electric power is supplied from the other second electric storage device 8 of the two second electric storage devices 7 and 8.

In other words, the second DC/DC converter 6 is provided with a number of input side terminal pairs according to the number of the second electric storage devices.

Each of the first DC/DC converter 3, the inverter 4, and the second DC/DC converter 6 has a function of being controlled so that the respective outputs are changed by the control device 9. In order to bring each of the first DC/DC converter 3, the inverter 4, and the second DC/DC converter 6 into a required operation state, in order that the control device 9 can instruct each of the first DC/DC converter 3, the inverter 4, and the second DC/DC converter 6, the terminal 9a of the control device 9 is connected to the terminal 4f of the inverter 4, the terminal 9b of the control device 9 is connected to the terminal 3e of the first DC/DC converter 9, and the terminal 9c of the control device 9 is connected to the terminal 6g of the second DC/DC converter 6.

The first DC/DC converter 3, the inverter 4 and the second DC/DC converter 6 are the main components of the power conversion device of the present embodiment.

The above description explains the connection status between the components.

An example of the function and the operation in FIG. 2 which is an example of the circuit diagram in each component will be described below.

In the inverter 4, a source terminal of a MOSFET 41a and a drain terminal of a MOSFET 41b are connected, a source terminal of the MOSFET 41c and a drain terminal of the MOSFET 41d are connected, and a source terminal of a MOSFET 41e and a drain terminal of a MOSFET 41f are connected to each other. A drain terminal of the MOSFET 41a, the drain terminal of the MOSFET 41c and the drain terminal of the MOSFET 41e are connected, the source terminal of MOSFET 41b, the source terminal of MOSFET 41d and a source terminal of MOSFET 41f are connected. The drain terminal of the MOSFET 41a and one terminal of a smoothing capacitor 41g are respectively connected to the terminal 4a. The source terminal of the MOSFET 41b and the other terminal of the smoothing capacitor 41g are respectively connected to the terminal 4b. The source terminal of the MOSFET 41a and the terminal 4c are connected, the source terminal of the MOSFET 41c and the terminal 4d are connected, and the source terminal of the MOSFET 41e and the terminal 4e are connected.

In the first DC/DC converter 3, a source terminal of a MOSFET 31b and a drain terminal of the MOSFET 31c are connected, and the connection point is connected to one terminal of a smoothing inductor 31d. The other terminal of the smoothing inductor 31d is connected to one terminal of a smoothing capacitor 31e and the terminal 3c, a source terminal of the MOSFET 31c is connected to respectively the other terminal of the smoothing capacitor 31e and a terminal 3d. A drain terminal of the MOSFET 31b is connected to one terminal of a smoothing capacitor 31a and the terminal 3a, a drain terminal of the MOSFET 31c is connected to the other terminal of the smoothing capacitor 31a and a terminal 3b.

In the second DC/DC converter 6, a source terminal of a MOSFET 61c which is the first switching element (hereinafter simply referred to as "MOSFET 61c") and the drain terminal of the MOSFET 61d which is the second switching element (hereinafter simply referred to as "MOSFET 61d") are connected, and the connection point is connected to one terminal of the smoothing inductor 61b which is a smooth element (hereinafter simply referred to as "MOSFET 61g").

The drain terminal of the MOSFET 61e is connected to one terminal of the smoothing capacitor 61e and the terminal 6c, the source terminal of the MOSFET 61d is respectively connected to the other terminal of the smoothing capacitor 61e and the terminal 6d.

As shown in FIG. 2, the MOSFET 61c and the MOSFET 61d connected in series constitute a first half bridge.

The source terminal of the MOSFET 61f which is the third switching element (hereinafter simply referred to as "MOSFET 61g") is connected to the MOSFET 61g which is the fourth switching element (hereinafter simply referred to as "MOSFET 61g"), and the connection point is connected to the source terminal of the MOSFET 61d. The drain terminal of the MOSFET 61f is connected to one terminal of the smoothing capacitor 61h and the terminal 6e, the source terminal of the MOSFET 61g is connected to the other terminal of the smoothing capacitor 61h and the terminal 6f.

The other terminal of the smoothing inductor 61b is connected to the smoothing capacitor 61a which is a smooth element (hereinafter simply referred to as "smoothing capacitor 61a") and the terminal 6a, the source terminal of the MOSFET 61g is connected to the other terminal of the smoothing capacitor 61a and the terminal 6b.

As shown in FIG. 2, a second half bridge is constituted by MOSFETs 61f and 61g connected in series to each other.

As shown in FIG. 2, the smoothing inductor 61b and the smoothing capacitor 61h are shared by the first half bridge and the second half bridge.

The terminal 9a of the control device 9 for instructing an operation state necessary for each component is connected to the terminal 4f of the inverter 4, the terminal 9b is connected to the terminal 3e of the first DC/DC converter 3, the terminal 9c is connected to the terminal 6g of the second DC/DC converter 6, the terminal 9d is connected to the terminal 5d of the motor generator 5, the terminal 9e is connected to the terminal 2c of the vehicle onboard electrical component 2.

By adopting the above system configuration, the control device 9 issues a command of the necessary operation state to each component while controlling the operation state of each aforesaid component while monitoring the system.

Figure 4:
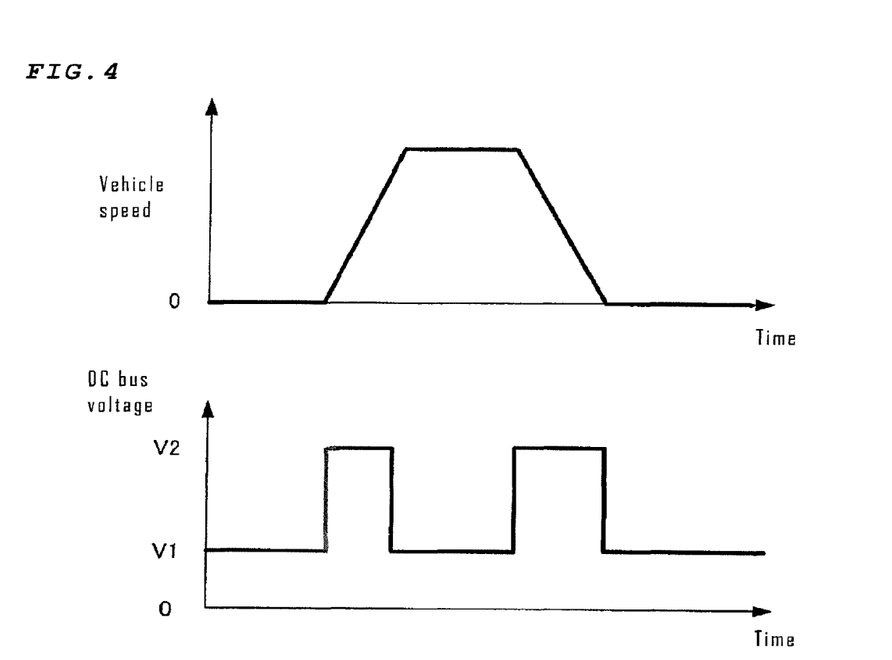
FIG. 4 is a diagram schematically showing a relationship between a vehicle speed and a DC bus voltage (pulse-like) of an inverter in the power conversion device according to a first embodiment of the present invention.

FIG. 4 illustratively and schematically shows the relationship between the vehicle speed and the DC bus voltage of the inverter. Further, the system operation in each vehicle control state will be described based on FIG. 2 with reference to FIG. 4.

An example of a first vehicle control state (first control state) is a control state in the case of "M/G start" (step ST2 in FIG. 3). The term "M/G start" refers to when the motor generator (M/G) is used for restarting the engine from a state (idling stop state) in which the engine is stopped in a state where the vehicle is in a stopped state due for example to signal waiting. In the first control state, the MOSFET 61c and the MOSFET 61g in the second DC/DC converter 6 are turned on and the MOSFET 61d and the MOSFET 61f are turned off so as to set the DC bus voltage of the inverter to a low voltage (for example, 14V), so that only the second instantaneous power storage device 7 can be seen from the DC bus 4DCB of the inverter 6. While monitoring the SOC (State Of Charge (charge state)) of the first electric storage device 7, the MOSFET 61d and the MOSFET 61f are turned on at a timing lower than a predetermined SOC, and the MOSFET 61c and the MOSFET 61g are turned off. And, at the timing when the second electric storage device 8 falls below the predetermined SOC, the turning on the MOSFET 61c and the MOSFET 61g and turning off the MOSFET 61d and the MOSFET 61f, and these operation are repeated.

As a result, the second power storage device 7 and the second power storage device 8 are alternately connected to the DC bus 4DCB of the inverter 6, by setting the voltage of the DC bus 4DCB to a low voltage (for example, 12V) (step ST3 in FIG. 3), when starting the motor generator (M/G) 5, it is possible to prevent an excessive current from flowing to the inverter 4 and the motor generator (M/G) 5, breakage of the inverter 4 and the motor generator (M/G) 5 can be avoided.

In addition, since the voltage of the DC bus 4DCB becomes a low voltage, the generation loss in the MOSFETs 41a to 41f of the inverter 4 can be reduced, the radiator of the inverter 4 can be simplified, and the downsizing of the inverter 4 can be realized.

Further, conventionally, the SOC of the second electric storage device 7 and the second electric storage device 8 adjusts the voltage balance over several hours, in the first embodiment, the voltage balance can be adjusted in increments of several seconds in accordance with the SOC and energy charging and discharging of each electric storage device 7, 8, it is possible to downsize the electric storage devices 7 and 8 without setting the surplus size in consideration of imbalance of voltage.

Further, when it is possible to supply a current that can supply the starting requisite torque with the withstand current of the inverter 4 and only by the impedance of the motor generator (M/G) 5, by driving the motor generator 5 with a 180-degree energization in a few switching times as the driving method of the inverter 4, the semiconductor loss of the MOSFETs 41*a* to 41*f* of the inverter 4 can be greatly reduced, the inverter 4 can be downsized.

Further, even if the inverter 4 is driven by PWM, while the conventional bus voltage is in a high constant state, the semiconductor loss of the MOSFETS 41*a* to 41*f* of the inverter 4 can be reduced and the inverter 4 can be downsized.

The example of the second vehicle control state (first control state) is the case of the control state when the "vehicle onboard electrical component is on heavy load" (step ST4 in FIG. 3). As in the case of the first vehicle control state described above, by operating the second DC/DC converter 6, the voltage of the DC bus 4DCB can be set to a low voltage (step ST3 in FIG. 3), it is possible to reduce the generation loss in the first DC/DC converter 3, it is possible to simplify the radiator of the first DC/DC converter 3, and the downsizing of the first DC/DC converter 3 can be realized.

Further, in the second vehicle control state described above, the occurrence loss is reduced by lowering the input voltage of the first DC/DC converter 3 has been explained, however, when the MOSFET 31*b* of the first DC/DC converter 3 is turned on and the MOSFET 31*c* is turned off to continuously supply the power to the vehicle onboard electrical equipment 2, the generation loss of the first DC/DC converter 3 can be greatly reduced.

Further, by reducing the generation loss of the first DC/DC converter 3, it is possible to downsizing the first DC/DC converter 3.

In addition, due to the reduction in the generation loss of the first DC/DC converter 3, for example, it becomes possible to cope with the conventional setting in the vehicle interior (installation in the passenger compartment of the first DC/DC converter 3) to the installation in the engine room under high temperature environment (installation in the engine room of the first DC/DC converter 3), it is possible to shorten the path (wiring) of a large current (100 A to 200 A) between the first DC/DC converter 3 and the first electric storage device 1 (installed in the engine room), and energy saving of the vehicle can be realized by reducing generation loss at the wiring.

An example of the third vehicle control state (second control state) is the case of the control state at "deceleration energy regeneration" (step ST5 in FIG. 3).

At this time, unlike the above-described operation in the first and the second vehicle control states, the MOSFET 61*c* and the MOSFET 61*f* of the second DC/DC converter 6 are turned on, by turning off the MOSFET 61*d* and the MOFSET 61*g*, it is possible to set the voltage of the DC bus 4DCB to a high voltage (for example, 48V) (step ST6 in FIG. 3), it is possible to positively recover the large decelerating regenerative energy from the motor generator 5 to the first and second electric storage devices 1, 7, and 8.

Further, when the deceleration energy decreases, by causing the second DC/DC converter 6 to operate in the above-described first vehicle control state, the voltage balance adjustment becomes possible in several seconds while considering the SOC of each of the second electric storage devices 7 and 8, it is possible to downsize the electric storage devices 7 and 8 without setting the surplus size in consideration of the imbalance of voltage.

An example of the fourth vehicle control state (second control state) is the case of the control state at a "torque assist" (step ST7 in FIG. 3). In this case, by operating the second DC/DC converter 6 so that the voltage of the DC bus 4DCB increases (step ST6 in FIG. 3), by supplying a high electric power to the motor generator 5 to generate a torque and assisting the torque on the engine drive shaft, the energy conservation of the vehicle can be realized by moving the operating point of the engine to a high efficiency point to reduce the amount of gasoline required for driving.

Figure 5:
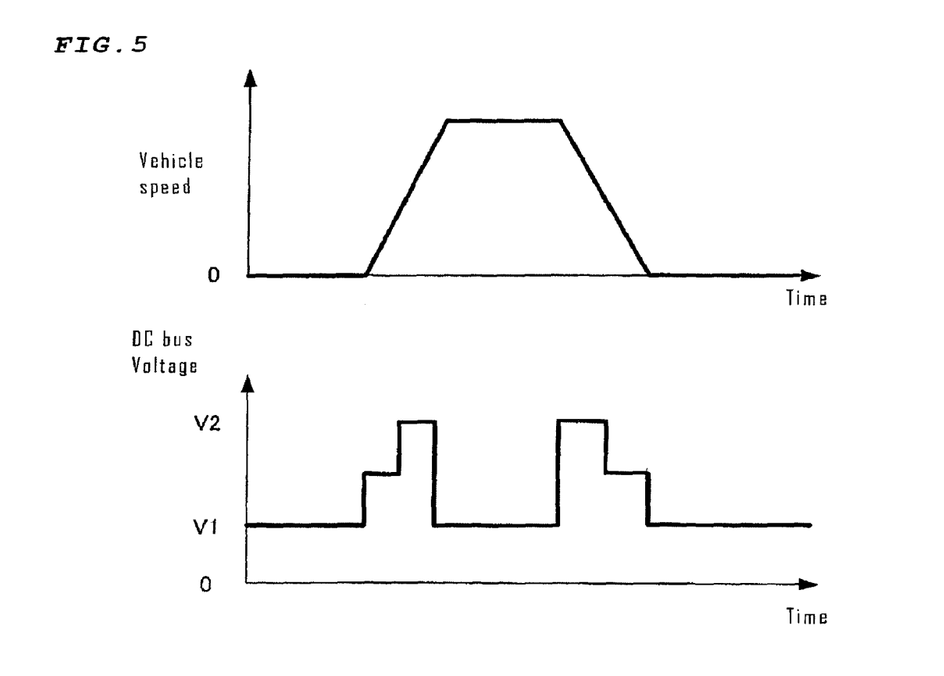
FIG. 5 is a diagram schematically showing a relationship between a vehicle speed and a direct-current bus voltage (stepwise) of an inverter in the power conversion device according to a first embodiment of the present invention.

In addition, the second DC/DC converter 6 changes the voltage of the DC bus 4DCB according to the rotation speed of the motor generator 5, by controlling the pulse-like from the example shown in FIG. 4 to the stepwise illustrated in FIG. 5, the generation loss of the MOSFETs 61*c*, 61*d*, 61*f*, and 61*g* of the second DC/DC converter 6 can be reduced.

In the third and fourth vehicle control states, by changing the voltage of the DC bus 4DCB in a pulse-like or stepwise as shown in FIG. 4 or FIG. 5, since no switching loss occurs in the switching element of the second DC/DC converter, it has low loss and can be downsized.

In addition, conventionally, it is possible to cope with arrangement in an environment higher than the passenger compartment, for example, the placement in the engine room, by reducing the loss of the first DC/DC converter 3 conventionally disposed in the passenger compartment.

Further, by selectively charging and discharging the plurality of second electric storage devices 7, and 8, it is possible to control the state of charge between the second electric storage devices 7 and 8 in real time together with the electric power flow control.

Further, in the second electric storage device 7 and the second electric storage device 8, in the present embodiment, one to two series connections can be selectively switched, there is no state of parallel connection and an excessive inrush current occurring when the electric storage device is paralleled in the voltage imbalance state of each electric storage device does not occur.

Further, in the above-described first to fourth vehicle control states, by the "ECU (Electronic Control Unit/Engine Control Unit) 100 which controls the vehicle operation" at the upper level of the control system by the control device 9, are recognized/identified. The control device 9 performs the above-described operation based on the aforesaid first to fourth vehicle control state signals (vehicle control state signal) SCCS (step ST1 in FIG. 3) received from the ECU 100.

In the first embodiment of the present invention, although a MOSFET (field effect transistor) is used as a switching element, similar effects can be obtained by using a bipolar transistor, an insulated bipolar transistor (IGBT), a silicon carbide transistor, or a silicon carbide MOSFET.

Further, in the first embodiment of the present invention, as the circuit configuration of the first DC/DC converter 3, although a non-insulated type step-down chopper circuit has been described as an example, it suffices if it can step down, the circuit configuration and the type of the first DC/DC converter 3 are not particularly limited as long as it is a non-insulated type or an insulation type circuit system that can be inferred by one skilled in the art.

In the first embodiment of the present invention, the motor generator 5 and the inverter 4 have been described by exemplifying a set of three-phase circuit schemes, but the same effect can be obtained with two or more sets of three-phase circuit schemes.

In the first embodiment of the present invention, although the case where the second DC/DC converter has the LC filter (reactor 61b, capacitor 61a) has been described as an example, the same effect can be obtained by using an LC filter including the parasitic inductance of the wiring of the DC bus, the smoothing capacitor 41g of the inverter 4, and the capacitor 31a of the first DC/DC converter 3.

Further, in the first embodiment of the present invention, although the first power storage device and the second power storage device have been described by exemplifying those having different electric characteristics at different voltages, the same effect can be obtained by using the same electric characteristics with different voltages.

Second Embodiment

Hereinafter, an example of the power conversion device according to the second embodiment of the present invention will be described.

Since the configuration diagram of the power conversion device according to the second embodiment of the present invention is similar to the one shown in FIGS. 1 to 2 in the first embodiment, the description of the circuit configuration will be omitted.

Since the operation state of the power conversion device according to the second embodiment of the present invention is the same as that described in the first embodiment as to the operation of the first DC/DC converter 3, its explanation will be omitted.

Figure 6:
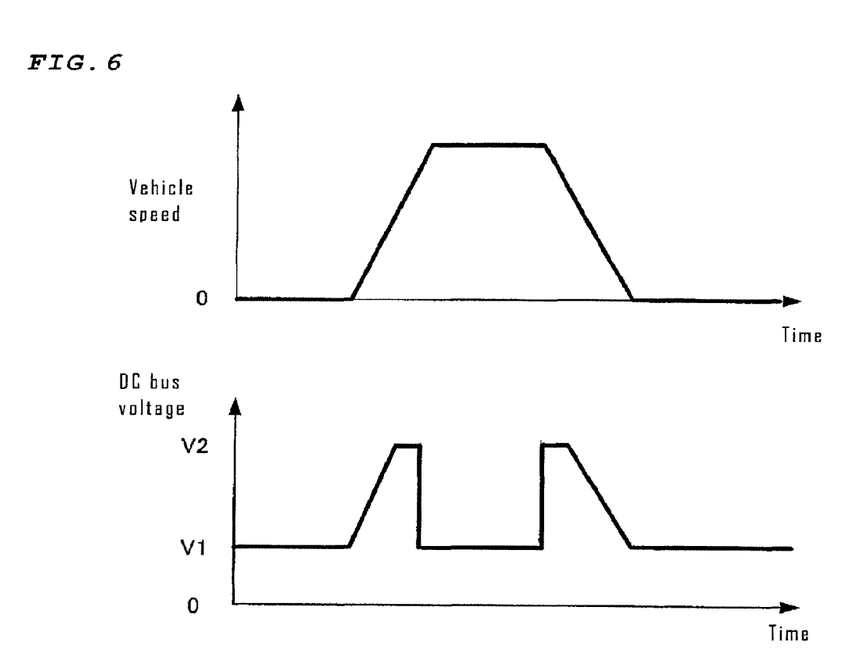
FIG. 6 is a diagram schematically showing the relationship between the vehicle speed and the DC bus voltage (ramp shape) of the inverter in the power conversion device according to a second embodiment of the present invention.

The difference with the first embodiment is the operation of the second DC/DC converter 6. In the first embodiment, the second DC/DC converter 6 is an operation of switching the voltage of the DC bus 4DCB in a step shape manner, in the second embodiment, the MOSFETs 61a and 61f and the MOSFETs 61d and 61g of the second DC/DC converter 6 are set and perform the PWM operation by performing complementary switching, it is possible to control the voltage of the DC bus 4DCB in a ramp shape (see FIG. 6). As a result, when the control by the inverter 4 is the PWM drive, the control response of the inverter 4 can be lowered, which can be realized by a simple control circuit.

Further, when the inverter 4 is energized at 180 degrees, the semiconductor loss of the MOSFETs 41a to 41f of the inverter 4 can be reduced while controlling the current supplied to the motor generator 5, and the inverter 4 can be downsized.

Further, in the present embodiment, the second electric storage device 7 and the second electric storage device 8, which are electrically insulated from each other, has a selective switching from any one of the second electric storage devices 7 and 8 to the series connection of the two second electric storage devices 7 and 8, alternatively, it is possible to selectively switch to one from the above two. There is no state in which the second electric storage device 7 and the second electric storage device 8 are connected in parallel and an excessive inrush current that occurs when the electric storage devices 7 and 8 are parallelized in the voltage unbalanced state of the electric storage devices 7 and 8 does not occur.

As in the case of the first embodiment of the present invention, in the second embodiment of the present invention, although a MOSFET (field effect transistor) is used as a switching element, the same effect can be obtained by using a bipolar transistor, an insulated bipolar transistor (IGBT), a silicon carbide transistor, or a silicon carbide MOSFET.

As in the case of the first embodiment of the present invention, in the second embodiment of the present invention, a description has been given of a non-isolated step-down chopper circuit as the circuit configuration of the first DC/DC converter 3, as long as it can lower the voltage, there is no particular limitation as long as it is a non-insulated type or an insulation type circuit system which can be inferred by one skilled in the art.

Further, as in the case of the first embodiment of the present invention, in the second embodiment of the present invention, although the motor generator 5 and the inverter 4 have been described with a single three-phase circuit system, similar effects can be obtained with two or more sets of three-phase circuit schemes.

As in the case of the first embodiment of the present invention, the second DC/DC converter has the LC filter (reactor 61b, capacitor 61a) in the second embodiment of the present invention, and the given explanation, the same effect can be obtained by using an LC filter constituted by the parasitic inductance of the wiring of the DC bus, the smoothing capacitor 41g of the inverter 4, and the capacitor 31a of the first DC/DC converter 3.

Further, as in the case of the first embodiment of the present invention, in the second embodiment of the present invention, although the first power storage device and the second power storage device have been described as having different electric characteristics at different voltages, the same effect can be obtained even when using the same electric characteristics with different voltages.

Third Embodiment

Hereinafter, an example of the power conversion device according to the third embodiment of the present invention will be described.

Since the configuration diagram of the power conversion device according to the third embodiment of the present invention is similar to the one on FIG. 1 and FIG. 2 shown in the first embodiment and the second embodiment, the description of the circuit configuration is omitted.

Further, since the operation state of the power conversion device according to the third Embodiment of the present invention is the same as the one described in the first Embodiment and the second Embodiment, the explanation is omitted.

Figure 7:
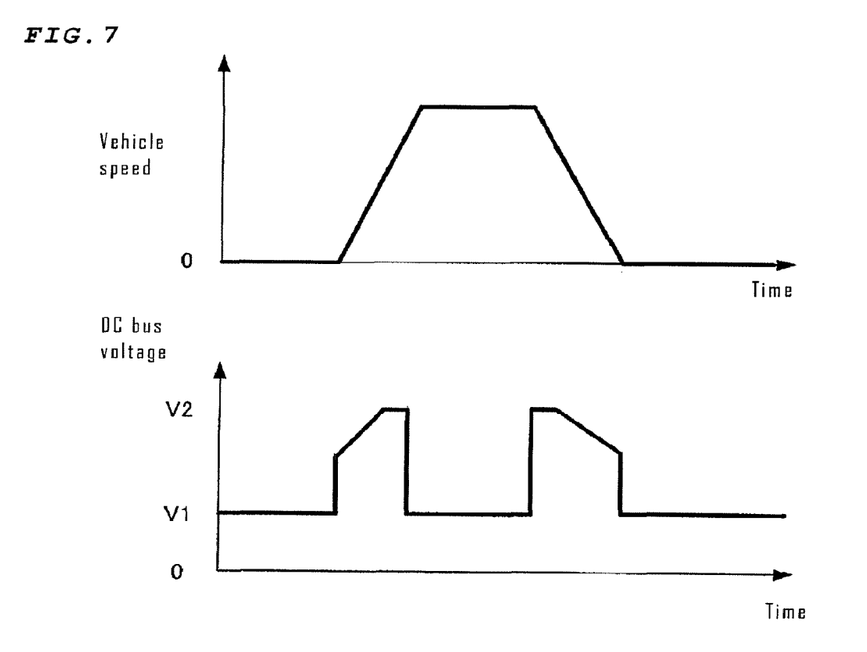
FIG. 7 is a diagram schematically showing a relationship between a vehicle speed and a DC bus voltage (ramp shape) of an inverter in a power conversion device according to a third embodiment of the present invention.

The difference from the second embodiment is the operation of the second DC/DC converter 6. In the second embodiment, the MOSFETs 61a and 61f and the MOSFETs 61d and 61g of the second DC/DC converter 2 are set to perform the PWM operation by switching complementarily. However, in the third embodiment, the MOSFET 61a maintains the ON state, the MOSFET 61f maintains the OFF state, by complementarily switching the MOSFETs 61d and 61g, it is possible to control the DC bus voltage to a lamp shape as illustrated in FIG. 7. As a result, the generation loss of the MOSFET can be reduced, and the size of the second DC/DC converter can be reduced.

In addition, in the present invention, the second electric storage device 7 and the second electric storage device 8 are, selectively switched by one to three series connections, there is no state of parallel connection and the excessive inrush current occurring when the electric storage device is parallelized in the voltage imbalance state of each electric storage device does not occur.

Further, an example in which three second electric storage devices are provided is shown as a fourth embodiment.

As in the case of the first embodiment of the present invention, in the third embodiment of the present invention, a MOSFET (field-effect transistor) is used as a switching element, the same effect can be obtained by using a bipolar transistor, an insulated bipolar transistor (IGBT), a silicon carbide transistor, or a silicon carbide MOSFET.

In addition, as in the case of the first embodiment of the present invention, In the third embodiment of the present invention, although the description has been made with the non-insulated type step-down chopper circuit as the circuit configuration of the first DC/DC converter 3, there is no particular limitation as long as it is a non-insulated type or an insulation type circuit system which can be inferred by one skilled in the art.

As in the case of the first embodiment of the present invention, in the third embodiment of the present invention, although the motor generator 5 and the inverter 4 have been described with a single three-phase circuit system, similar effects can be obtained with two or more sets of three-phase circuit schemes.

Further, as in the case of the first embodiment of the present invention, in the third embodiment of the present invention, although the case where the second DC/DC converter owns the LC filter (reactor 61b, capacitor 61a) has been described, the same effect can be obtained by using an LC filter constituted by the parasitic inductance of the wiring of the DC bus, the smoothing capacitor 41g of the inverter 4, and the capacitor 31a of the first DC/DC converter 3.

In the third embodiment of the present invention, the MOSFET 61a maintains the ON state, the MOSFET 61f maintains the OFF state, by the MOSFETs 61d and 61g complementarily switched, although it has been described that the DC bus voltage can be controlled like a ramp, the MOSFET 61a maintains the OFF state, the MOSFET 61f maintains the ON state, and the same effect can be obtained by switching MOSFETs 61d and 61g complementarily. Further, as in the case of the first embodiment of the present invention, in the third embodiment of the present invention, although the first electric storage device and the second electric storage device have been described as having different electric characteristics at different voltages, the same effect can be obtained by using the same electric characteristics with different voltages.

Fourth Embodiment

Hereinafter, an example of the power conversion device according to the fourth embodiment of the present invention will be described.

Figure 8:
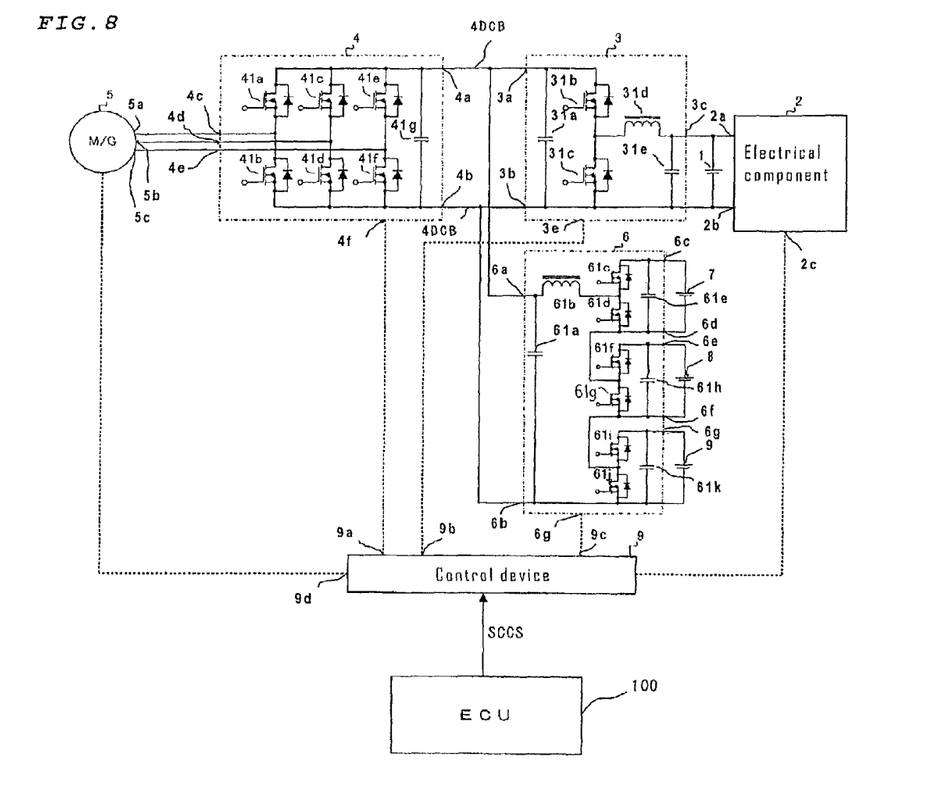
FIG. 8 is a circuit diagram showing a power conversion device according to a fourth embodiment of the present invention.

FIG. 8 shows a configuration diagram of a power conversion device according to a fourth embodiment of the present invention. The difference is the circuit configuration of the second DC/DC converter 6. In particular, in the second DC/DC converter 6 of the first embodiment, a second electric storage device 10, a smoothing capacitor 61k, a MOSFET 61i, and a MOSFET 61j are added. The fourth embodiment is an example in the case where three second power storage devices of the second DC/DC converter 6 are used.

In the second DC/DC converter 6, the source terminal of the MOSFET 61c and the drain terminal of the MOSFET 61d are connected, and its connection point is connected to one terminal of the smoothing inductor 61b. The drain terminal of the MOSFET 61c is connected to one terminal of the smoothing capacitor 61e and the terminal 6c, the source terminal of the MOSFET 61d is connected respectively to the other terminal of the smoothing capacitor 61e and the terminal 6d. The source terminal of the MOSFET 61f is connected to the drain terminal of the MOSFET 61g, and its connection point is connected to the source terminal of the MOSFET 61d. The drain terminal of the MOSFET 61f is connected to one terminal of the smoothing capacitor 61h and the terminal 6e, the source terminal of the MOSFET 619 is connected to the other terminal of the smoothing capacitor 61h and the terminal 6f. The source terminal of MOSFET 61i and the drain terminal of MOSFET are connected, and its connection point is connected to the source terminal of the MOSFET 61g. The drain terminal of the MOSFET 61i is connected to one terminal of the smoothing capacitor 61k and the terminal 6e, the source terminal of the MOSFET 61j is connected to the other terminal of the smoothing capacitor 61k, the terminal 6h, and the terminal 6b. The third electric storage device 10 is connected between the terminals 6g-6h.

In the fourth embodiment of the present invention, for example, when the "M/G start" which is the first vehicle control state and the "vehicle onboard electrical component is heavy load" which is the second vehicle control state, among the second electric storage devices 7, 8, 10, the second DC/DC converter is operated so that the one having the highest state of charge is preferentially connected to the DC bus 4DCB, in the third vehicle control state "deceleration energy regeneration" and the fourth vehicle control state "torque assist", the second DC/DC converter 6 is operated such that the one having the lowest charge state among the second electric storage devices 7, 8, 10 is connected to the DC bus 4DCB of the inverter 6 preferentially. As a result, by selectively charging and discharging a plurality of electric storage devices in consideration of the state of charge, it is possible to control a plurality of electric storage device charging states in real time together with the electric power flow control accompanying the transition of the vehicle control state. Circuit operations other than the above-described operation are the same as those in the first to third embodiments of the present invention, so their explanation will be omitted. As a result, the maximum value of the DC bus voltage can be increased, and it is possible to increase the deceleration regenerative energy amount or to increase the input power of the torque assist and to improve fuel economy. Further, in the fourth embodiment, the second electric storage devices 7, 8, there is no state in which it is possible to selectively switch one to three series connections in parallel, and an excessive inrush current occurring when the electric storage device is parallelized in the voltage imbalance state of each electric storage device 7, 8, 10 does not occur.

In the fourth embodiment of the present invention, as in the first embodiment, the first to fourth vehicle control states described above, by the "ECU 100 controlling vehicle operation" located at the upper level of the control system by control device 9, are recognized/identified. The control device 9 performs the above-described operation based on the first to fourth vehicle control state signals (vehicle control state signal) SCCS received from the ECU 100. As in the case of the first embodiment of the present invention, in the fourth embodiment of the present invention, although a MOSFET (field effect transistor) is used as a switching element, the same effect can be obtained by using a bipolar transistor, an insulated bipolar transistor (IGBT), a silicon carbide transistor, or a silicon carbide MOSFET.

As in the case of the first embodiment of the present invention, in the fourth embodiment of the present invention, as the circuit configuration of the first DC/DC converter 3, although the description has been made with the non-insulated type step-down chopper circuit, it suffices as long as it can step down, and as long as it is a non-insulated type or an insulation type circuit system which can be inferred by one skilled in the art.

Further, as in the case of the first embodiment of the present invention, in the fourth embodiment of the present invention, although the motor generator 5 and the inverter 4 have been described with a single three-phase circuit system, the same effect can be obtained with two or more sets of three-phase circuit schemes.

In addition, as in the case of the first embodiment of the present invention, in the fourth embodiment of the present invention, the case where the second DC/DC converter has the LC filter (reactor 61b, capacitor 61a) has been described, the same effect can be obtained by using an LC filter including the parasitic inductance of the wiring of the DC bus, the smoothing capacitor 41g of the inverter 4, and the capacitor 31a of the first DC/DC converter 3.

Further, in the fourth embodiment of the present invention, the MOSFET 61a maintains the ON state, the MOSFET Elf maintains the OFF state, with the MOSFETs 61d and 61g switching complementarily, although it has been described that the DC bus voltage can be controlled like a ramp, the MOSFET 61a maintains the OFF state, the MOSFET 61f maintains the ON state, the same effect can be obtained by switching MOSFETs 61d and 61g complementarily. As in the case of the first embodiment of the present invention, in the fourth embodiment of the present invention, the first electric storage device and the second electric storage device have been described as having different electric characteristics at different voltages, the same effect can be obtained by using the same electric characteristics with different voltages.

Fifth Embodiment

Hereinafter, an example of the power conversion device according to the fifth embodiment of the present invention will be described.

Figure 9:
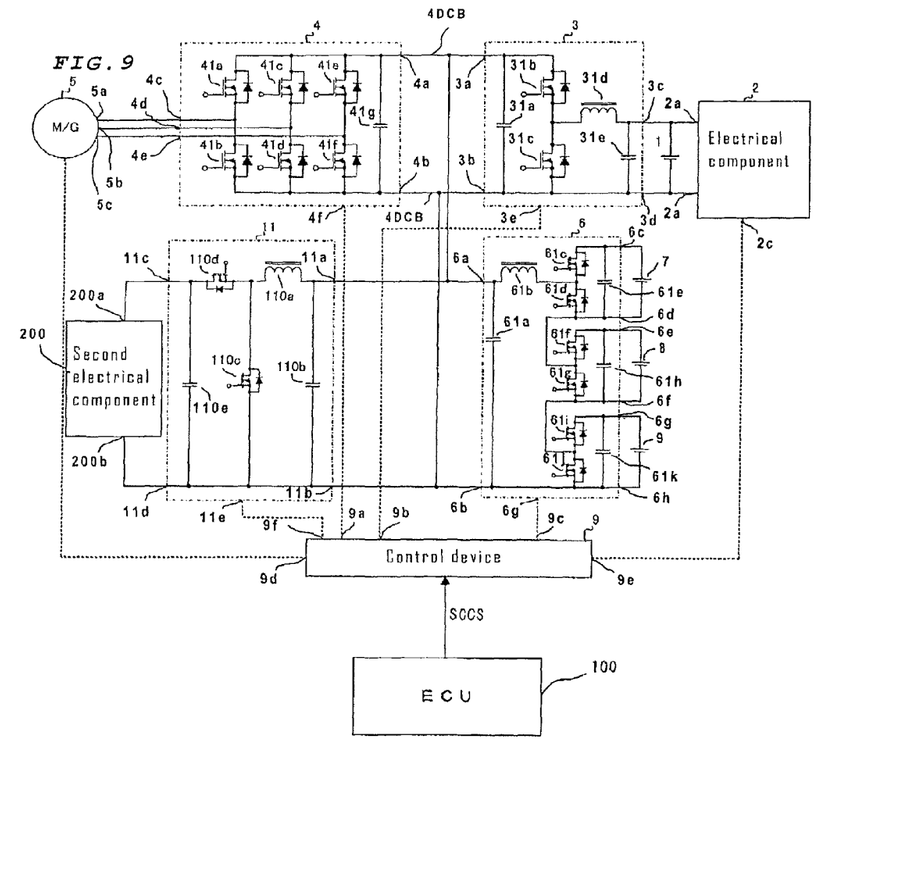
FIG. 9 is a circuit diagram of a power conversion device according to a fifth embodiment of the present invention.

FIG. 9 shows a configuration diagram of a power conversion device according to a fifth embodiment of the present invention. The difference from the first embodiment to the fourth embodiment is that in the first to fourth embodiments, only a low-voltage electrical components 2 mounted on the vehicle are used, in the fifth embodiment, when a vehicle onboard high-voltage second electrical component 200 is required, and a third DC/DC converter 11 which is a step-up DC/DC converter for supplying power to the second electrical component 200 is added.

In the third DC/DC converter 11, one end of a reactor 110a, one end of a smoothing capacitor 110b, and a terminal 11a are respectively connected, the other end of the reactor 110a, a drain terminal of the MOSFET 110c, and a source terminal of the MOSFET 110d are respectively connected. A drain terminal of the MOSFET 110d, one end of a smoothing capacitor 110e and a terminal 11c are respectively connected, the other end of the smoothing capacitor 110b, a source terminal of the MOSFET 110c, the other end of the smoothing capacitor 110e, and a terminal 11d are respectively connected. The terminal 6a and the terminal 11a, the terminal 6b and the terminal 11b are respectively connected, a terminal 200a and the terminal 11c and a terminal 200b and the terminal 11d of the vehicle onboard second electrical component 200 are respectively connected. A terminal 9f of the control device 9 and the terminal 11e are connected.

Circuit operations other than the above-described operation are the same as those in the first to fourth embodiments of the present invention, and thus description thereof will be omitted.

In the fifth embodiment of the present invention, the third DC/DC converter 11 operates with the lowest boost in the input voltage range and the output voltage range.

As a result, it is possible to realize the third DC/DC converter 11 in a small size.

As a result, it becomes possible to use both the vehicle onboard low-voltage electrical component 2 and the onboard high-voltage second electrical component 200 in a compatible manner, it is possible to increase the power input to the electrical components, and to increase the use destination of the energy of the electric storage device leads to improvement in fuel economy.

In addition, in the present embodiment, the second electric storage device 7, the second electric storage device 8, and the second electric storage device 10, can selectively switch one to three serial connections. There is no state in which the second electric storage devices 7, 8, 10 are connected in parallel, an excessive inrush current that occurs when parallelizing the electric storage devices 7, 8, 10 in the voltage imbalance state of the respective electric storage devices 7, 8, 10 does not occur.

In addition, as in the case of the first embodiment of the present invention, in the fifth embodiment of the present invention, although a MOSFET (field effect transistor) is used as a switching element, similar effects can be obtained by using a bipolar transistor, an insulated bipolar transistor (IGBT), a silicon carbide transistor, or a silicon carbide MOSFET.

Further, as in the case of the first embodiment of the present invention, in the fifth embodiment of the present invention, as the circuit configuration of the first DC/DC converter 3, although the description has been made with the non-insulated type step-down chopper circuit, there is no particular limitation as long as it is a non-insulated type or an insulation type circuit system which can be inferred by one skilled in the art.

Further, as in the case of the first embodiment of the present invention, in the fifth embodiment of the present invention, although the motor generator 5 and the inverter 4 have been described with a single three-phase circuit system, the same effect can be obtained with two or more sets of three-phase circuit schemes.

As in the case of the first embodiment of the present invention, in the fifth embodiment of the present invention, the case where the second DC/DC converter has the LC filter (reactor 61b, capacitor 61a) has been described, the same effect can be obtained by using an LC filter including the parasitic inductance of the wiring of the DC bus, the smoothing capacitor 41g of the inverter 4, and the capacitor 31a of the first DC/DC converter 3.

Further, in the fifth embodiment of the present invention, the MOSFET 61a maintains the ON state, the MOSFET Elf maintains the OFF state, by switching complementarily the MOSFETs 61d and 61g, although it has been described that the DC bus voltage can be controlled like a ramp, the MOSFET 61a maintains the OFF state, the MOSFET 61f maintains the ON state, the same effect can be obtained by switching MOSFETs 61d and 61g complementarily.

In the first to fifth embodiments of the present invention, although it is preferable that the second electric storage devices 7, 8, and 10 are a nickel metal hydride battery, a lithium ion battery, and other instantaneous type electric storage device (high power density type (compared with the high energy density type, it has a large current charging/discharging characteristic with a small accumulated energy amount but a large short-time charging/discharging current)), and it is preferable that the first power storage device 7 is lead battery and other persistent type (high energy density type (characteristics of charge/discharge characteristics of high energy with a large accumulated energy amount but a short time charging/discharging current as compared with the high power density type)), for example, the first electric storage device 7 may be a nickel metal hydride battery, a lithium ion battery, and appropriate batteries may be appropriately used within the range of achieving the effects of the present invention.

Further, in the fifth embodiment of the present invention, although the MOSFET 110*d* is used as a rectifying element, the same effect can be obtained by using a diode which is a unidirectional rectifying element or a silicon carbide diode.

In addition, in the first to fifth embodiments, the control device 9 may be provided in the ECU 100.

Further, in the first to fifth embodiments, it is assumed that the magnitude relation of "the voltage of the electrical component 200>the voltage of the electrical component 2", the voltage of the electrical component 2 is, for example, 12V (example, not limited to 12V), the electrical equipment 2 are, for example, headlights, car navigation systems, and audio equipment.

The voltage of the electrical component 200 is, for example, 48V (example, not limited to 48V), the electrical component 200 is, for example, the EPS (electric power steering), as well as electric air conditioner.

Further, in the case of the aforesaid 12V and 48V voltages, the voltage of the DC bus 4DCB is as shown in the following (a) to (e).

(a) The voltage of the DC bus 4DCB in the first vehicle control state is 12V (example, not limited to 12V).

(b) The voltage of the DC bus 4DCB in the second vehicle control state is 12V (example, not limited to 12V).

(c) The voltage of the DC bus 4DCB in the third vehicle control state is 48V (example, not limited to 48V).

(d) The voltage of the DC bus 4DCB in the fourth vehicle control state is 48V (example, not limited to 48V).

(e) The voltage of the DC bus 4DCB during the vehicle control state (steady running) other than the first to fourth vehicle control states is 12V (example, not limited to 12V).

Note that the present invention may be modified or omitted from each embodiment as appropriate within the scope of the invention.

Note that, in each drawing, the same symbols denote the same or equivalent portions.

REFERENCE SIGNS LIST

1 First electric storage device,
2 Automotive low-voltage electrical components,
2*a*, 2*b* Vehicle onboard electrical equipment terminals,
3 First DC/DC converter,
3*a*, 3*b*, 3*c*, 3*d*, 3*e* Terminals of the first DC/DC converter,
4 Inverter, DC bus of 4DCB inverter,
4*a*, 4*b*, 4*c*, 4*d*, 4*e*, 4*f* Terminals of the inverter,
5 Motor generator (M/G),
5*a*, 5*b*, 5*c* M/G terminals,
6 Second DC/DC converter,
6*a*, 6*b*, 6*c*, 6*d*, 6*e*, 6*f*, 6*g* Terminals of the second DC/DC converter,
7 Second electric storage device,
7*a*, 7*b* Output terminals of the second electric storage device,
8 Second electric storage device,
8*a*, 8*b* Output terminals of the second electric storage device,
9 Control device,
9*a*, 9*b*, 9*c*, 9*d*, 9*e*, 9*f* Terminals of the control device,
11 Third DC/DC converter,
100 ECU,
200 High-voltage second electrical components mounted on the vehicle,
SCCS Vehicle control status signal.

The invention claimed is:

1. A power conversion device, comprising:
an inverter for driving a motor generator,
a first electric storage device for supplying power to electric components,
a first DC/DC converter for connecting a DC bus of the inverter and the first electric storage device,
a plurality of electrically insulated second electric storage devices,
a second DC/DC converter using the plurality of electrically insulated second power storage devices as an input power source, and
a control device for controlling the motor generator, the first DC/DC converter, and the second DC/DC converter, wherein
the second DC/DC converter includes a first half bridge and a second half bridge,
the first half bridge includes a first switching element and a second switching element connected in series to each other and is connected between terminals of one of the plurality of second electric storage devices,
the second half bridge includes a third switching element and a fourth switching element connected in series to each other and is connected between terminals of other second electric storage devices,
a connection point of the third switching element and the fourth switching element of the second half bridge is connected to the first half bridge,
a connection point between the first switching element and the second switching element of the first half bridge is connected to the DC bus via a smoothing element shared by the first half bridge and the second half bridge, and wherein
the control device selectively switches among the plurality of electrically insulated second electric storage devices by controlling switching of the switching elements of each of the first half bridge and the second half bridge by controlling output of the second DC/DC converter, voltage of the DC bus in a first control state is lower than the voltage of the DC bus in a second control state.

2. The power conversion device according to claim 1, wherein the first electric storage device is a high energy density type electric storage device and the second electric storage device is a high electric power density type electric storage device.

3. The power conversion device according to claim 1, wherein the control device controls the second DC/DC converter so that, in a case that the first control state is a control state when the motor generator is started, the voltage of the DC bus in the first control state is made lower than the voltage of the DC bus in the second control state.

4. The power conversion device according to claim 1, wherein the control device controls the second DC/DC converter so that, in a case that the first control state is a control state that the electrical component fed from the first DC/DC converter is in a heavy load state, the voltage of the DC bus in the first control state is made lower than the voltage of the DC bus in the second control state.

5. The power conversion device according to claim 1, wherein the control device controls the second DC/DC converter so that the second control state is a time of deceleration energy regeneration or torque assist, the voltage of the DC bus in the second control state is made higher than the voltage of the aforesaid DC bus in the first control state.

6. The power conversion device according to claim 1, wherein output voltage of the second DC/DC converter is changed in a pulse-like waveform.

7. The power conversion device according to claim 1, wherein output voltage of the second DC/DC converter is changed in a stepwise waveform.

8. The power conversion device according to claim 1, wherein output voltage of the second DC/DC converter is changed in a ramp waveform.

9. The power conversion device according to claim 8, wherein control device controls a plurality of switching elements constituting the second DC/DC converter with the control device so that the output voltage of the second DC/DC converter is changed as a ramp waveform as an output voltage obtained by combining the switching operation of the plurality of switching elements and the switching operation of the switching element of the second DC/DC converter.

10. The power conversion device according to claim 1, comprising a third DC/DC converter for supplying power to the second electrical component with the DC bus as an input power source.

11. The power conversion device according to claim 10, the third DC/DC converter is a step-up DC/DC converter which is controlled by the control device in order to feed an output voltage at a lowest step-up ratio in an input voltage range and an output voltage range of the third DC/DC converter to the second electrical component.

12. The power conversion device according to claim 1, wherein an inductor in the second DC/DC converter is substituted with a parasitic inductance component between the second DC/DC converter and the DC bus.

13. The power conversion device according to claim 1, wherein, in the first control state, the plurality of second electric storage devices are connected in series to each other and are connected to the DC bus via the second DC/DC converter, and in the second control state, the plurality of second electric storage devices are alternately and independently connected to the DC bus via the second DC/DC converter.

14. The power conversion device according to claim 1, wherein the plurality of aforesaid second DC/DC converters are operated so that, in the first control state, the second electric storage device having the highest charge state among the plurality of second electric storage devices is connected to the DC bus, and in the second control state, the second electric storage device having the lowest charge state among the plurality of second electric storage devices is connected to the DC bus.

* * * * *